United States Patent [19]

Brelen et al.

[11] 4,240,815
[45] Dec. 23, 1980

[54] METHOD FOR DETERMINING THE SURFACE WEIGHT OF A MINERAL WOOL MAT

[75] Inventors: Hans Brelén, Skövde; Stellan Dahlberg, Tiden; Ulf Åberg, Skövde, all of Sweden

[73] Assignee: Rockwool Aktiebolaget, Skovde, Sweden

[21] Appl. No.: 33,023

[22] Filed: Apr. 24, 1979

[30] Foreign Application Priority Data

Apr. 28, 1978 [SE] Sweden ................................ 7804923

[51] Int. Cl.³ ............................................. C03B 37/04
[52] U.S. Cl. ................................................. 65/2; 65/5; 65/4 R; 65/9; 65/29; 65/162; 65/163
[58] Field of Search .................... 65/2, 4 R, 9, 29, 162, 65/163, 5, 15

[56] References Cited

U.S. PATENT DOCUMENTS

| | | | |
|---|---|---|---|
| 3,539,316 | 11/1970 | Trethewey | 65/162 X |
| 3,762,896 | 10/1973 | Borst | 65/29 X |
| 4,040,563 | 8/1977 | Schairer | 65/162 X |

FOREIGN PATENT DOCUMENTS

198197  8/1967  U.S.S.R. ..................................... 65/163

*Primary Examiner*—Robert L. Lindsay, Jr.
*Attorney, Agent, or Firm*—Larson, Taylor and Hinds

[57] ABSTRACT

A method is provided for improving the uniformity of the surface weight of a mineral wool mat. The mat is produced from a mineral melt which is converted into fibers, these fibers being introduced into a gas-formed stream providing a transport medium for these fibers. The transport medium and the mineral fibers carried thereby are transported to a moveable collector band on one side of which the mineral wool is deposited so as to form the mineral wool mat, the transport medium being caused to pass through the collector band by means of a fan or the like. The method comprises measuring at least one variable which is characteristic of the transport medium and which varies in relationship to the amount of mineral wool deposited. Examples of such a variable include the pressure drop across the transport medium when passing through the mineral wool mat, the rise in temperature of the transport medium due to heat transfer from the mineral material, and the power supplied to the fan which provides movement of the transport medium. The results of the measuring step are fed to a control device for controlling the speed of movement of the collector band such that the speed of the collector band is varied in direct relationship to the amount of fiber deposited on the collector band, i.e., the greater the amount of fiber, the greater the speed, whereby the mineral fiber material is deposited on the collector band with an evenly distributed surface weight.

14 Claims, 1 Drawing Figure

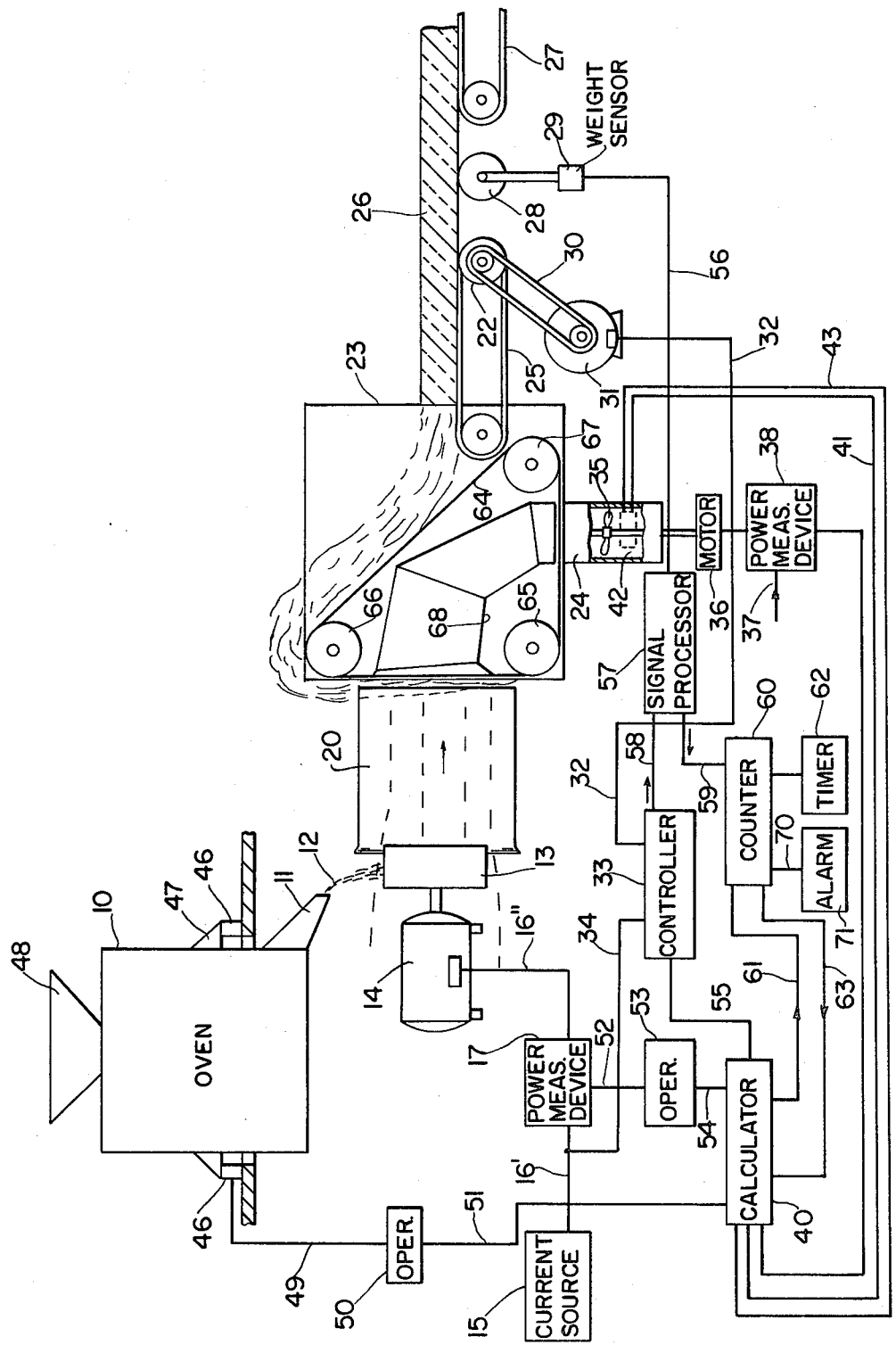

METHOD FOR DETERMINING THE SURFACE WEIGHT OF A MINERAL WOOL MAT

In the production of mineral wool, a melt is first created from mineral-containing raw material. One may use, as a melting system, cupola ovens, winnows, electrode ovens and so on. For each type of raw material melt there is, as a rule, one or more melting systems providing acceptable operation. For other compositions of the melt and for other working conditions, other melting systems may be used. In the production of mineral wool, the melt is caused to move continuously to one or more fibration units. Also as far as the fibration unit is concerned, there are a number of possibilities, but for each separate case, nevertheless, the choice of a suitable fibration unit and of suitable fibration methods is more limited. Amongst the fibration systems for production of mineral wool those are predominant which use rotational bodies for throwing out fibres of mineral wool in combination with streams of gas for collecting the mineral wool and transferring same to a collection means, usually a continuously moveable band.

A frequently used system for production of mineral wool comprises a cupola oven working with coke as the main fuel. The cupola oven is charged with a mixture of the mineral concerned, e.g. stone, and coke, and in the cupola oven the mineral is made molten by means of the heat developed by the coke when burnt, blast air being impressed into the lowermost part of the oven. Through an outlet opening in the lower part of the oven, melt is streaming out continuously. By means of a system of melt flutes, the melt is thereafter conducted to a fibration unit, usually comprising two or up to four so called spinner wheels, mounted each on its separate horizontal shaft at substantially the same vertical level. Thereby, the spinner weels are so arranged, that the melt will first hit one of them, thereafter be thrown to the next one and so on. From the spinner weels, the melt exits in the form of a great number of threads, which due to the centrifugal force and perhaps also under influence of a slot of air or gas, moving around the spinner weels and more or less completely surrounding them, are re-shaped into fibres. By.the influence of the stream of air, the fibres as shaped are thrown away from the fibration system. Thereafter, a separation of the transport air and the mineral wook takes place by the transport medium along with the mineral wool dispersed therein being conducted to and through a transparent conveyor band. Thereby, the transport medium passes through the conveyor band, whereas the mass of mineral fibres, which are often more or less clotted to mineral wool pellets, will form a comprehensive mineral wool mat on the side of the conveyor band away from the direction of the transport medium stream.

A basic problem in the production of mineral wool has been to cause an evenly distributed and pre-determined surface weight of the mineral wool mat. As a matter of fact, in the continuous treatment of the mineral wool mat, mats or discs or the like will be produced in given thicknesses. The surface weight which the mineral wool mat possesses therefore will be determinative of the density which the final products will obtain. The density of the mineral wool products is of an essential importance for their properties but, of course, also for the production costs of same. If a given density is necessary in order to get given properties of the produced product, then there is a very great economic interest in the product not getting a density more or less by a factor which varies and, thereby, essentially supercedes the desired density. Therefore, one tries to get a state in which the mineral wool products should have densities which life within a very narrow range. This, in turn, causes a corresponding demand for the surface weight of the mineral wool mat, from which the mineral wool products are produced. If now the mineral wool mat should move at a constant speed and, simultaneously, the production of mineral wool should remain at a constant and pre-determined level, then also the surface weight of the mineral wool mat should be constant and predictable. However, the production of mineral wool varies from one moment to the next one. This has meant that one tried to control the propagation speed of the mineral wool mat so that the said variation would be compensated for, such that at a decreasing production, the speed of movement of the mat should be less and vice versa.

It has previously been found that, if mechanical forces are used for the fibration, the demand for power for the fibration system will be in a given relation to the amount of mineral wool created, even if this relation is not completely constant. If, namely, more melt is fed to the fibration system, this will require more power and vice versa, but simultaneously with an increased feed of melt, also more mineral wool will be formed.

Another possibility of control comprises continuously to measure the amount of melt given off per unit of time from the melting system, which means the oven. This, for instance, can take place by continuously or at even intervals of time measuring the weight of the melting system along with the melt therein, and determining in this way the decrease of weight per unit of time.

It has also been proposed to combine these two possibilities and, thus, to add into one single control procedure the demand of power of the fibration system and the decrease of weight per unit of time of the melting system. This combined control procedure has given a better result than could be achieved by each of the two control methods separately.

However, it has been found that even with the last mentioned method of control, it has not been possible to remove all reasons for variations of the surface weight of the mineral wool mat and to keep this surface weight completely constant or at least suffiently constant for satisfying the above mentioned desires. As a matter of fact, it has been found that further circumstances of known or not yet fully known character influence the production of mineral wool per unit of time, and that the last mentioned circumstances will not be fully accounted for and in many a case not accounted for at all in the decrease of weight of the melting system, nor in the demand for power of the fibration system. Such variations, created due to the last mentioned reasons, therefore also are not affected a corresponding change of the speed of the mineral wool mat, and consequently, variations still will occur in the surface weight of the mineral wool mat.

Up to the present time, it has been regarded inavoidable for all control of the production of mineral wool, in order that the produced mineral wool mat shall get a surface weight as nearly as possible constant, one will have to supervise said surface weight by means of continuously acting weighing devices. This, therefore, means that one will have to introduce into the production line proper balances for measuring the surface weight, which usually was done in such a way that these balances were brought to measure what one believed to be the weight of the mineral wool mat for a very short length, which was, further, in movement. Such an arrangement, however, cannot be regarded a sufficiently exact method because in order that the balance shall give an indication, in a way common to all balances, a depression of the mineral wool mat against the action of some measurable force has to take place, and this force has then been regarded as an expression of the surface weight of the mineral wool mat in the place subject to this measuring operation. The disadvantage of such an arrangement, therefore is that during the actual depression of the mineral wool mat for influencing the weighing device, the mineral wool mat is subjected to a change of shape, and this, in turn, causes a force for compensation of the resistance against change of shape. The force required for compensation of said resistance against change of shape of the mineral wool mat, however, neither is constant, nor is it in any given relation to the surface weight of the mineral wool mat, and it will, therefore, introduce an error into the measurement result, which may be very difficult to estimate as to its magnitude in order to provide compensation.

The present invention is based upon the inventive realization that: (i) during a change of the flow through the manfacturing procedure, which is a function of the amount of mineral wool produced per unit of time, certain phenomenon occur which may be measured as to their magnitude without the mineral wool mat needing to be subjected to any change of shape of the above mentioned type, and that (i.i) the change of these magnitudes each in its own way, can be precisely calculated often in a very exact relation to the surface weight. By making the measurement on basis of one of these phenomenon, one way, therefore, derive an expressaion for the amount of mineral wool formed. Of course, there is nothing to prevent one from measuring, at some other place of the production line, the surface weight by weighing in the traditional way. Said weighing, which due to its nature can only register a variation of the surface weight of the mineral wool mat which has already occurred, however, will only be applicable for a checking of the correctness of the deduction and will give a basis for adjustment of the deduction procedure.

Amongst the phenomenon of the above mentioned type which have been observed, one is of especially great importance. As mentioned above, the formed mineral wool is transported from the fibration unit by means of a stream of some medium, which may comprise air or a gas or some mixture of air and gas. It is very common to use for this purpose combustion gases in an appropriate mixing with fresh air, whereby one has the opportunity to control the temperature of the gas or the gas-air-mixture used, here and in the following description referred to as the "transport medium". The transport medium, thus, is separated from the mineral wool formed, after this has been deposited on a perforated conveyor band or simultaneously with this deposition, usually by creating either a surplus of pressure to the transport medium above the conveyor and collector band or by creating a vacuum below said band, which will draw in the transport medium through the perforations of the conveyor band leaving the mineral wool on the conveyor band.

In the investigations forming basis of the present invention it has proved the the pressure drop of the transport medium when passing through the formed mineral wool mat varies with the amount of mineral wool per unit of surface deposited and thus also with the surface weight of the mineral wool.

A difference of pressure, therefore, is created between the transport medium above and below the collection band, or, in any case there will be created a pressure drop when the transport medium passes through the collection band. As a matter of fact, it has been found that the pressure drop when the transport medium passes through an unloaded conveyor and collection band is so small or, in any case constant, and thus may be disregarded in the present connection. However, once a mineral wool mat has been deposited on the collection band this mineral wool mat will cause a resistance against the movement of the transport medium of a very characteristic order of magnitude. This resistance, is completely or very close to completely proportional to the amount of fibres in the deposited mineral wool mat and, therefore, to the surface weight of the mineral wool mat. The more constant the tightness of the mineral wool mat is, the more one will approach to the complete proportionality. Variations in the resistance will give corresponding variations in the pressure drop. To simplify matters, one may use, as a measure of the pressure drop, the degree of vacuum on the gas and the air in the transport medium below the collection band.

It is true that the tightness of the mineral wool mat varies along with several manufacturing vaiables, such as the composition of the melt, the power fed for fibration, the circumstances of movement of the transport medium and so on, but during usual manufacturing circumstances they are not so great that they will prevent the use of the method according to the invention.

As the composition of the melt from which the mineral wool is prepared during one and the same spinning phase must be regarded constant, it will also be evident that at least approximately, the tightness of the formed mineral wool mat will also be rather constant.

Therefore, it is obvious that a first property of the transport medium, indicative to the surface weight of the formed mineral wool mat, is formed by the pressure drop when the transport medium passes through the mineral wool mat, and that this pressure drop may, if the transport medium has a constant pressure above the collection band, such as is usually the case, be measured in the form of the degree of vacuum existing in the transport medium below the collection band. This vacuum, therefore, may be measured by traditional means for determining the gas pressure, e.g. a manometer.

One has, however, also found other properties of the transport medium which may be used for sensing a value which is indicative of the surface weight of the mineral wool mat in each separate part along the production line.

It is obvious that the greater the amount of mineral wool at the location where the measurement of the properties takes place, the greater the resistance will be against movement of the transport medium, and this, in turn will affect the consumption of power used for driving the vacuum creating fan. Therefore, one may use this relation by providing a separate motor for driving the fan, not in common for the remaining motors existing in the system, and measuring its consumption of power. This may be done either by measuring the current to the motor, for instance if this is a three phase motor, by means of an ammeter in one of the feeder conduits, or by measuring the demand for power itself by means of a watt meter.

A method for driving fans, which is very suitable for the big fans, which as a rule are used in these systems, is to use direct current motors controllable as to their number of turns, and the speed thereof, the latter often being controlled by means of a thyristor coupling. Also in such driving systems electrical magnitudes may easily be measured, which are proportional to the output power of the motor.

With rising resistance against movement of the transport medium through the mat, the flow of transport medium will decrease, and this, in turn, will cause a decrease of the demand of power to the motor. In this connection, it should be remembered that the fan is to be regarded a rotational means having two different functions viz. firstly to overcome the bearing friction and the air friction, which is characteristically very small and may therefore be disregarded, and secondly to put the transport medium into movement, and that, consequently, in a manner which is well known, a fan driving motor will idle if the feed of the medium is prevented which would otherwise be put into movement by the fan. In other words, the greater a resistance the mineral wool mat offers to the stream of transport medium, the less of such medium will pass through the mat, and the less will be the demand of power on the fan motor.

Thus, it is possible to use the demand of power for driving the fan motor as a means for indication of the surface weight of the mineral wool mat formed.

The transport medium, usually, comprises combustion gases or air or a mixture of combustion gases and air. If either only air is used, or air mixed with combustion gases, in which the combustion has been brought to an end, it may be assumed that the temperature of the transport medium at the inlet of the section of the system, where mineral wool is deposited for forming the mineral wool mat, is constant. When a non-preheated air is used its temperature will normally be equal to the temperature in the space around the area from which the air is collected. If combustion gases only are used, or combustion gases in combination with air, then, of course, the temperature will be higher. In the last mentioned case, of course, the temperature of the combustion gases or the mixture of air and combustion gases, respectively at the inlet to the section may vary from time to time.

Not withstanding the above, it is nevertheless obvious that the temperature of the melt as it exists when given off to the spinner unit is essentially higher than the mean temperature of the transport medium. A heating of the transport medium, therefore, cannot be avoided by heat transfer from the melt under fibration to the transport medium. Also this heating will be in a given relation to the amount of mineral wool formed.

Thus, it is obvious that one may use the rise of temperature of the transport medium as a measure of the amount of mineral wool deposited or, if the propagation speed of the mineral wool mat is constant, as a measure of the surface weight of the mat.

There is one approach for substantially remarkably improving the usefulness of the above method, mentioned in connection with the rise of temperature of the transport medium and the amount of mineral wool formed per unit of time. If, for instance, the amount of mineral wool deposited should increase, then also the resistance to the movement of the transport medium will increase and the amount of moving transport medium per unit of time will decrease if no specific steps are taken to keep the stream of transport medium constant. Consequently, also, by virtue of heat transfer from the mineral wool to the transport medium, the temperature of said medium after the mineral wool has given off its heat thereto, will in this case be higher than would otherwise be the case. As a matter of fact, the temperature of the transport medium rises therefore more rapidly than simply proportionally to the increased amount of mineral wool during the time beginning from the introduction of the melt until the separation of the mineral wool formed on the surface of the conveyor band. The heat transfer from the mineralic material to the transport medium takes place exceedingly quickly due to the large surface area achieved by the material during the fibration. When the fibration is close to completion, further the heat transfer from the fibres is practically instantaneous, because the fibres have a radius less than the wave length of the infra red light, which is characteristic of the temperatures concerned. This means that heat energy is given off from the interior of the fibres without absorption in the exterior parts of the fibre.

From this, it will be evident that one could as well observe the rise of temperature of the transport medium and calculate therefrom a reliable statement about the amount of mineral wool formed per unit of time and derive in this way an expression for the surface weight, which would in no way be less precise than an expression achieved by direct weighing. In fact the expression for the surface weight obtained by reading the rise in temperatures will be more exact, because one will, by this method of measurement, avoid any kind of change of shape of the mineral wool mat and, thus, also one may ignore the power required for compensation of the work associated with the change in shape.

If, now, the transport medium has a reasonably constant temperature, usually equal to the temperature of the surrounding air, then one may be satisfied with measuring the temperature in a place immediately after the transport medium has passed through the mineral wool mat, and this temperature may be read by some means, which may for instance produce a voltage proportional to or dependent upon the temperature, said voltage thereafter being fed to a calculator by means of which the propagation speed of the collection band is controlled in some way, not forming part of the present invention, to provide equalizing of the surface weight. If, on the other hand, the transport medium should have an indeterminate temperature at the inlet to the section concerned, or have a temperature which may vary, then one should instead use a temperature difference by determining the temperature both before and after the transport medium passes through the mineral wool mat and deduce the difference of temperature or, in other words, the rise of temperature, which in turn forms an expression for the surface weight of the mineral wool mat deposited.

It will be evident from the above that there is a given relation even if not necessarily a relation of proportionality between the stream of transport medium, on the one hand, and the amount of mineral wool deposited, on the other hand. This relation, thus, may be measured in a plurality of different ways, for instance, as mentioned above, by measuring the power for driving the transport medium, or by measuring its temperature rise. However, it is also possible to measure the amount of movements of the transport medium per unit of time or, in other words, directly measuring the speed of movement of the transport medium, and one may then as well use the expression for this relation as an indicator of the amount of mineral wool deposited, and its surface weight.

For providing a measurement of the speed of movement of the transport medium itself, one may use some arrangement, known per se for measurement of speeds of streaming movement, e.g. a Pitot tube, perhaps balanced by means of a pressure equalizing tube in a way, which is well known, for instance from vessel logs.

It is also possible to use one or more anemometers. It has proved especially favourable for this purpose to use thermo-electrically functioning anemometers, also called "hot wire anemometers", because from them one will get a direct expression, preferably in the form of an electric resistance or an electric voltage, which may without any transformation be used as an expression for the surface weight of the mineral wool mat deposited.

It will be evident from the above that one has a plurality of ways to proceed in the use of the properties of the transport medium for indication of the amount of mineral wool and thereby of the surface weight of the deposited mat of mineral wool, and that the choice of which amongst these properties would be most suitable in each separate case will be dependent upon the specific circumstances of the case concerned.

The invention is of a very great importance in systems in which in order to increase accuracy in the control of the speed of movement of the conveyor band for achieving a constant surface weight of the mineral wool mat produced, the surface weight is not only determined by real measurement but also where a prognosis in advance of an expected change of the surface weight is made, and by preparatory steps this change is prevented. It is, of course, evident that in such a system it is of great importance that the prognosis be made on the basis of an estimation of the surface weight provided by other means than the subsequent checking of the surface weight itself by simple measurement. In such a case, one may use anyone of the above mentioned methods for estimation of the surface weight on basis of properties of the transport medium for the prognosis then, further control the speed of movement of the collection band on basis of the prognosis so that any tendency of a later change of the surface weight is counteracted, and finally check the result of these steps by measurement.

The invention will be further described below in connection with an arrangement for the last mentioned purpose, which is shown in the attached drawing, but it is understood that the invention shall not be limited to this specific embodiment of the invention but that many different modifications are to be included within the scope of the invention.

In the embodiment shown in the drawing, the mineral melt is obtained from a melting oven 10, which is charged, at its upper end, with a mixture, prepared in advance, of mineral, e.g. some suitable kind of stone in a suitable degree of crushing and fuel, the last mentioned preferably in the form of coke, which may be burnt in the oven, thereby melting the mineral, whereafter the melt is tapped off at an outlet 11 in the lower part of the oven in the form of a stream 12, which is fed to a spinner unit 13, here represented by one single spinner wheel.

The spinner unit 13 is driven by a motor 14, which gets its current from a source of current 15, through conduits 16', 16" and a power measurement device 17, initially from an electric distribution network. The mineral wool is formed in the spinner unit 13 by thin threads of melt being thrown out from the spinner unit, especially from the last spinner wheel in same, and being caught by a stream of gasformed and/or airformed transport medium. A jacket 22 is provided for guiding the transport medium along with the threads forming the mineral wool and carried up by said transport medium so that this transport medium will along with the mineral wool caught therein be transferred to a collector device 23, which will be further described below, and in which different products may be sprayed thereon in a way known per se. In this collector device the transport medium is removed through a waste material channel 24. The mineral wool, on the other hand, is deposited on the part of the collector band 25 which faces the spinner unit and is removed in the form of a mat 26.

From the collector band 25 the formed mineral wool mat is conveyed over one or more further conveyor bands, e.g. the conveyor band 27, to be treated in one way or another, said treatment forming no part of the present invention.

Between the two said conveyor bands 25 and 27 a weighing device is introduced, which has for its purpose to continuously measure during the movement of the mineral wool mat 26 its surface weight. Schematically, this weighing device has been indicated in the form of an easily rotational roller 28, very light in weight, said roller resting on a weight sensing means 29.

In the parts hitherto described, the arrangement is conventional, no specific steps being taken to cause that the mineral wool mat 26 should achieve a more constant and exact surface weight.

The collector band 25 is driven through a power transmission 30 from a motor 31 which in a way which will be further explained below over a channel 32, a controller 33 and a conductor 34, is connected through a conductor to the voltage feeder line 16'.

For the control and supervision explained above, of the surface weight of the mineral wool mat formed, the following sensing means are provided. The transport medium is driven by a fan. In the drawing this fan has been shown at 35 in the waste material channel 24, thereby driven by a motor 36. The fan 35, thus, in this case acts as a suction fan, but one could as well arrange the fan so that it would force the transport medium into the spinner unit 13.

The motor 36 is, over a conduit 37, which is not shown in full in the drawing, connected to a source of current. This last mentioned source, preferably, may be a separate source of current. The demand for power of the motor 36 is measured by means of a power measurement instrument 38. In the out put conduit 39 from said power measurement instrument 38, thus, one will get an expression for the consumption of power required for driving the transport medium. As explained above, this expression is also related to the surface weight of the mineral wool mat 26 produced from the mineral wool from the spinner unit 13. The reading of the power measurement device 38 is transmitted, over a conduit 39, to a counter unit 40 of dator type.

Underneath the transport and conveyor band 25 further means are provided which measure other properties of the transport medium, as explained above. Schematically, these means have been shown as if they were applied in the outlet channel 24 in the form of an apparatus 42. This apparatus 42 may be arranged to measure the total stream per unit of time of the transport medium and to deliver the reading to the counter or calculator 40 over a conduit 43, or the apparatus 42 may be arranged to measure the temperature of the transport medium after it has passed through the collection band, more specifically through a part 64 thereof, further defined below, and to transfer this indication over the conduit 44 to the calculator unit 40.

In practice, of course, it will not be necessary to use all of the indicating means mentioned, but one may make a choice between any specific one or any specific combination of means for indicating the demand of power for driving the transport medium, means for indicating the amount of the moving transport medium, and/or the temperature of the moving transport medium after it has deposited the transported mineral wool material on the conveyor and collector band 64 or 25, respectively.

It has previously been mentioned that it was earlier proposed to use in addition thereto one or both of the indications for the amount of mineral wool deposited on the collector band and, thereby, of the surface weight, viz. on the one hand, the weight of the oven 10 and on the other hand the demand for power in driving the spinner unit 13. It is true that both of these possibilities are not as favourable as each of the two possibilities mentioned above, the indications of which are transferred to the counter unit 40 over the conduits 43 and 44, but in many a case it will be possible to gain advantages by using a plurality of different indications for processing in the calculator 40 so that the result produced by said unit will be a kind of a mean value based on the different types of observations.

An especially advantageous way of carrying out the method according to the present invention is through programming of the control so that it will automatically eliminate or in any case minimize such changes of a measuring value which do not correspond to any of the other measured values. As an example, it may be mentioned that at the times when the oven is charged, weighing of the oven weight will erroneously indicate that no melt is removed or, perhaps, that melt is moving in a impossible direction i.e., back to the oven. However, during same period of time, the spinner aggregate 13 will consume power, and the transport medium will be heated and so on. The decrease of the speed of the transport medium, which would be caused by the seeming lack of feed of melt, therefore, must not be effectuated and will therefore not be effectuated. In a corresponding way, disturbances and errors in the remaining measurements may be revealed by lack of consonance with the remaining observations.

For the said purpose, in the drawing, means for the last mentioned two observations have also been shown, but it should be especially mentioned that it is not at all necessary to use them.

Thus, the melting oven is elastically supported and in some suitable way one or more pressure or load sensors 46 are provided in the elastic support, for instance so that they are symmetrically distributed around the circumference of the oven 10 and support feet 47 of the oven 10. In this way, sensors 46 will indicate the weight of the oven 10 along with the molten or non-molten, burnt or non-burnt material existing in the oven. Successively as the weight of this material decreases by melt being removed in the form of the stream 12 to the spinner unit 13 or successively as the weight increases by further material being fed through the charging arrangement 48 to the oven, its total weight will change. Over a conduit 48, the weight indications are transferred to an operator or processor unit 50. The weight indications are treated by this operator 50 so that, in the output conduit 51 to the calculator 40, the weight of the oven 10 along with the material therein will not appear but only the changes of said total weight, caused by melt being given off through the stream 12, which may for instance take place in the form of a pulse train of variable frequency or in the form of a voltage of variable magnitude.

From the above mentioned power measuring instrument 17, indicating the demand of power for driving the spinner unit, an indication is also transferred over the conduit 52, an operator 53 and the conduit 54 to the calculator 40. This calculating 40, therefore, receives not only the indications created according to the present invention over one or two or all three of the conduits 39, 43 and 44, but also in a way, which was earlier proposed, indications for same purpose or a similar purpose over the conduits 51 and 54. The indication over the conduit 54, therefore, has been subjected to a numerical or mathematical treatment in the operator 53 so that this indication will be revised in relation to the indication over the conduit 52 fed to the calculator 40 over the conduit 54.

In the calculator 40, thereafter, a mathematically numerical treatment takes place of one or two or all three of the indications transmitted through one or two or all three of the conduits 39, 43 and 44 as well as, perhaps, in addition thereto over the conduits 51 and 54 with the consequence that a control magnitude will appear in the output conduit 55 of the controller 33, previously mentioned. This controller, in turn, will determine over the conduit 32 the rotational speed of the motor 31 and, thereby, the speed of movement of the collection band 25.

The indication from the weight sensor 29, controlled over the weighing device 28, is transferred over a conduit 56 to a signal treatment unit 57, which will calculate the mean weight of the mineral wool mat 27 formed and produce an output related to the mean weight of same. The treatment unit 57, over the conduit 58, receives an input related to the speed of movement of the band and produces, over the conduit 59, an output to a counter unit 60 about the production proper as calculated from these input data, said unit like the remaining calculator units in the system being of some kind known per se in the art.

The calculator unit 60, however, is not only fed with a signal over the conduit 59 related to the real production calculated as the product of real surface weight and real speed of movement of the band, but also, over a conduit 60 with a signal from the calculator 40 related to the predicted production as this production will appear from the variables fed to the calculator 40 and the parameters programmed into same.

Now, a difference may be formed in the counter unit 60 between the predicted production and the real production, regard thereby being taken with respect to the difference in time between the prognosis and the subsequent check weighing, and guided thereby, with due regard to the dimensions of the system, the speed of propagation of the mineral wool mat is determined. In this way, it is possible to cause the said formation of a difference to create an alarm signal, transferred over the conduit 70 to an alarm apparatus 71 at such times when the difference becomes greater than a predetermined value. Such differences may rise, even if they are suppressed in the above mentioned way, for instance, from erroneous handling of the equipment according to the invention.

The differences may also be taken into account for purposes of correction. Thus, it is possible to program the counter unit 60 in such a way that it will supply to the calculator 40, by feeding changed parameters over the conduit 63, an indication that the speed of movement of the band should be controlled so that the differences occurring will be as small as possible. The step of bringing the difference to a minimum in this way may take place according to the method of the least square and may advantageously be carried out in such a way that the recently made observations of differences have a stronger influence than earlier made observations.

For controlling the formation of the difference values, comparison of measured values and so on so that they take place at given intervals of time, a timer 62 has been provided in connection to the counter unit 60.

The method of prognosis or the result of the real production, respectively, deduced in this way in the calculator 40, consequently will be indicative of the production which may be expected to occur during the period of time of the operation of the system following next thereafter and determined by the timer 62, and this result is transferred over the conduit 55 to the controller 33 for the rotational speed of the motor 31, so that the speed of movement of the collector band 25 will be adapted to the reduced production in order to produce an evenly distributed and pre-determined surface weight of the mineral wool mat 26.

The collection system 23 comprises a perforated conveyor band 64, running over the wheels 65, 66 and 67, of which one, preferably the runner wheel 67, is arranged as a drive wheel. Wheel 67 is driven through a transmission device by a motor not shown in the drawing. Behind the band 64, viewed in the direction of movement of the transport medium, a suction case 68 is provided, which communicates with the above mentioned discharge channel 24 for the transport medium, in which the fan 35 is located.

The band 64 may be driven at same speed as the band 25. However, it may also run at a considerably lower speed, an increase of the surface weight thereby occurring at the transition between the two bands. This increase of the surface weight, in turn, may assume the form of a compression in the longitudinal direction of the mat or the form of an increase of the thickness, for instance in connection with a folding procedure, or it may take both of these forms.

It will be evident from the above, that there is the possibility of a rather wide range of choice between various inputs relating to surface weight of the mineral wool mat formed, fed to the calculator unit 40 in order of being processed and fed to the controller 33 in order to determine the speed of the band.

Among inputs, however, there is no primary input collected from the weighing device 28, 29, but all of the inputs have been collected in some other way, and the production, calculated or predicted from these inputs, thereafter has been compared with the real production as measured by means of the weighing device 28, 29. Of the inputs, used in this way for prognosis, those transmitted over the conduits 39, 43 and 44 are the most valuable, because they have been derived from properties of the transport medium, which, due to its small mass and heat capacity, possesses a very quick reaction. Therefore, a completely satisfactory prognosis may be obtained by using exclusively the information over one or two or all three of the said conduits, but if it should prove in practical tests that these inputs are subjected to a variation which is too quick, so that an instability may result, it may be advantageous to dampen such instability by introducing into the calculator 40 also reduced values of one or both of the essentially more slow acting variables, represented by the conduits 51 and 54.

In the two last mentioned cases, as a matter of fact, the variables are only slowly changeable because they are derived from great masses, which may only slowly be put into the movement required for creating the variable values. Specifically, there is a relatively slow change in the indication over the conduit 51, i.e. the mass of the oven along with its contents, and in the indication over the conduit 54, i.e. the mass of the driving motor 14 along with the spinner unit 13, of which the last mentioned runs at an extremely high speed and therefore has a basic inertia and will therefore also vary in speed and added power with considerable sluggishness.

Above, a plurality of variables have been mentioned, all of which having in common that they indicate values, which are in a given, although not necessarily linear, relation to the amount of mineral wool deposited and, thus, to the surface weight of the mineral wool mat. Some of these variables are quick acting, other ones slow acting, viz. those derived from great masses (the oven with its content) or from means rotating at a very high speed and with great inertia (the spinner unit, with its motor), but, although one prefers to use the quick acting variables as far as possible, one may, however, combine with them expressions derived from the slow acting variables in order to prevent instability as set forth above.

We claim:

1. A method for improving the uniformity of surface weight in a mineral wool mat, produced from a mineral melt which is fibrated in a fibration unit and is introduced into a gas-formed stream providing a transport medium for the fibers, whereafter the transport medium along with the mineral fiber material carried thereby is caused to move to a movable collector band on the one side of which the mineral fiber material is deposited to form the mineral wool mat, the transport medium being caused to pass through the collector band, said method comprising measuring at least one variable which is characteristic of the transport medium and which varies in relationship to the amount of mineral wool deposited, and feeding the results of the measuring step to a control device for controlling the speed of movement of the collector band such that the speed of the collector band is varied in direct relation to the amount of mineral fiber material deposited on the collector band, whereby the mineral fiber material is deposited on the collector band with an evenly distributed surface weight.

2. A method according to claim 1, wherein said measuring step comprises measuring the pressure drop to which the transport medium is subjected when passing through the mineral wool mat and the collector band.

3. A method according to claim 2, wherein the transport medium is caused to pass through the collector band and the mineral wool mat thereon by means of a vacuum created on the side of the collector band opposite to the side on which the mineral wool mat is deposited.

4. A method according to claim 1, wherein said measuring step comprises measuring the rise of temperature to which the transport medium is subjected due to heat transfer from the mineral material to the transport medium, said heat transfer taking place from the moment when the melt is fed to the fibration unit until the moment when the mineral wool has been deposited on the collector band.

5. A method according to claim 4, wherein the initial temperature of the transport medium is at least approximately constant, said measuring step comprising measuring the temperature of the transport medium after the transport medium has been separated from the mineral wool upon deposit of the latter on the collector band so that the temperature measured is a rise in temperature.

6. A method according to claim 1, wherein said measuring step comprises measuring the movement of said transport medium being caused by at least one fan.

7. A method according to claim 1, wherein a motor-driven means is used to provide movement of the transport medium and the mineral wool material carried thereby, said measuring step comprising measuring the power fed to the motor for said motor-driven means.

8. A method according to claim 7, wherein said motor has at least an approximately constant speed of rotation.

9. A method according to claim 8, wherein said motor comprises a three phase short circuit motor and the power is measured as a function of the current in one of the phase conductors.

10. A method according to claim 8, wherein said motor comprises a three-phase short-circuit motor and the power measured is the total wattmeter power.

11. A method according to claim 1, wherein the collector band is divided up in first and second parts with one following the other, the first part of the band being disposed adjacent to the fibration unit and operating at a speed which is higher than that of the other second part, the second part being more remote from the fibration unit, the mineral wool mat formed on the first part being subjected to compression when transferred to the second part, the measurement of the at least one variable of the transport medium being made during the passage of the transport medium through the first band part along with the mineral wool mat thereon.

12. A method according to claim 1, wherein the at least one variable which is characteristic of the transport is fed to a calculator for storage therein, at least a part of the stored value corresponding to said variable being used in providing a prognosis of the future changes in the surface weight of the mineral wool mat formed, and the result of this prognosis being transmitted to the control device for correcting any predicted change of the surface weight.

13. A method according to claim 12, wherein an indication of the actual surface weight of the formed mineral wool mat is derived and transmitted to said calculator for comparison with said prognosis, the difference between the actual surface weight of the mineral wool mat produced and the predicted surface weight for said mineral wool mat being utilized adaptively in a subsequent prognosis.

14. A method according to claim 13, wherein said indication of actual surface weight is obtained by a weighing step.

* * * * *